United States Patent
Bahr et al.

(10) Patent No.: US 9,049,644 B2
(45) Date of Patent: *Jun. 2, 2015

(54) METHOD FOR TRANSMITTING A BEACON IN A STAR NETWORK (MASTER-SLAVE AD HOC NETWORK) AND A SENSOR NODE IN A STAR NETWORK

(75) Inventors: Michael Bahr, Munich (DE); Jan Husak, Prague (CZ); Frank Lahner, Erlangen (DE); Norbert Vicari, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 119 days.

This patent is subject to a terminal disclaimer.

(21) Appl. No.: 13/509,073

(22) PCT Filed: Nov. 3, 2010

(86) PCT No.: PCT/EP2010/066757
§ 371 (c)(1),
(2), (4) Date: May 10, 2012

(87) PCT Pub. No.: WO2011/057932
PCT Pub. Date: May 19, 2011

(65) Prior Publication Data
US 2012/0224537 A1    Sep. 6, 2012

(30) Foreign Application Priority Data

Nov. 10, 2009   (DE) .......................... 10 2009 052 573

(51) Int. Cl.
*H04W 88/16* (2009.01)
*H04W 48/12* (2009.01)
*H04W 52/02* (2009.01)

(52) U.S. Cl.
CPC .......... *H04W 48/12* (2013.01); *H04W 52/0229* (2013.01)

(58) Field of Classification Search
CPC ....... H04W 4/00; H04W 4/008; H04W 16/00; H04W 28/0215; H04W 72/0446; H04W 84/18; H04W 88/16; H04W 7/0069; H04W 7/125; H04W 48/12; H04W 52/0229
USPC .............. 370/310, 312, 329–330, 241.1, 336, 370/338, 345, 400–401
See application file for complete search history.

(56) References Cited

U.S. PATENT DOCUMENTS 7,804,804 B2 *  9/2010  Sugaya et al. ................ 370/338
8,767,620 B2 *  7/2014  Kim et al. ..................... 370/328

(Continued)

FOREIGN PATENT DOCUMENTS

WO   WO 2009116682 A1   9/2009

OTHER PUBLICATIONS

Standard: IEEE 802.15.4—2006; Others.
EGTS Joint Proposal for IEEE 802.15.4e IEEE P802.15 Working Group for Wireless Personal Area Networks (WPANs), Jan. 2009; Others.
Sahinoglu, Z. et al.: »TG4e drafting—Draft specification for IEEE 802.15,4e Factory Automation‹, IEEE 802.15.4 document 15-09/401r3, Jul. 2009; Others.

(Continued)

*Primary Examiner* — Charles C Jiang
*Assistant Examiner* — Mohamed Kamara
(74) *Attorney, Agent, or Firm* — Cozen O'Connor

(57) ABSTRACT

A method for transmitting a beacon for a star network in manufacturing automation, for use in a communications protocol, such as IEEE Standard 802.15.4e, for manufacturing automation, using at least one gateway and at least one sensor node, wherein the beacon comprises a field including information about a number of base time slots in a superframe.

13 Claims, 3 Drawing Sheets

(56) References Cited

U.S. PATENT DOCUMENTS

| | | | | |
|---|---|---|---|---|
| 2005/0249167 | A1* | 11/2005 | Salokannel | 370/336 |
| 2007/0174465 | A1 | 7/2007 | Chiou | |
| 2008/0253327 | A1* | 10/2008 | Kohvakka et al. | 370/330 |
| 2009/0010233 | A1* | 1/2009 | Pratt et al. | 370/338 |
| 2009/0016314 | A1* | 1/2009 | Kim | 370/345 |
| 2009/0238160 | A1 | 9/2009 | Bhatti | |
| 2010/0014503 | A1* | 1/2010 | Shukla et al. | 370/345 |
| 2010/0034159 | A1* | 2/2010 | Shin et al. | 370/329 |
| 2011/0038343 | A1* | 2/2011 | Bhatti et al. | 370/330 |

OTHER PUBLICATIONS

Yang Yang, Heqing Huang, Haitao Liu, Liang Li, Jie Shen [Simit/Vinno/Huawei: "Different Frame Formats Analyses in Current 15.4E std Draft", IEEE 802.15 Working Group for Wireless Personal Area Networks (WPANS), [Online], Jan. 15, 2010, Seiten 1-27, [No. 865 Changning Road, Shanghai, 200050, China] gefunden im Internet: URL:https://mentor.ieee.org/802.15/dcn/10/15-10-0024-00-004e-different-frame-formats-analyses-in-current-15-4e-std-draft.ppt> [gefunden am Jan. 11, 2011] Seiten 13, 18; Others.

Office Action dated May 4, 2014 issued in the corresponding Chinese Patent Application No. 201080051002.3.

* cited by examiner

METHOD FOR TRANSMITTING A BEACON IN A STAR NETWORK (MASTER-SLAVE AD HOC NETWORK) AND A SENSOR NODE IN A STAR NETWORK

CROSS-REFERENCE TO RELATED APPLICATIONS

This is a U.S. national stage of application No. PCT/EP2010/066757 filed 3 Nov. 2010. Priority is claimed on German Application No. 10 2009 052 573.4 filed 10 Nov. 2009, the content of which is incorporated herein by reference in its entirety.

BACKGROUND OF THE INVENTION

1. Field of the Invention

The invention relates to a beacon for a star network, a sensor node in a star network and a method for operating a star network.

2. Description of the Related Art

Manufacturing automation imposes high requirements regarding latency between communications partners in wireless networks. This latency should be understood to be a period between the transmission of any message to one communications partner and the arrival of the message at the communications partner. Due to the special requirements in manufacturing, this latency should be kept as small as possible.

Architecture for a wireless network for use in manufacturing automation with a star network using a time slot method TDMA (time division multiple access) is known from the prior art, see Sahinoglu, Z. et al.: "TG4e drafting—Draft specification for IEEE 802.15.4e Factory Automation", IEEE 802.15.4 document 15-09/401r3, July 2009. Hereinafter, the above document will be referred to as [1].

The star network comprises at least one central node (i.e., a gateway) and a plurality of network nodes connected to this in a star shape. Since manufacturing automation usually employs "intelligent" sensors, hereinafter, the network nodes are also referred to as "sensor nodes". Here, intelligent sensors should be understood to be devices which, in addition to their sensory function also have functionalities that ensure integration in a network, bidirectional communication with other network devices and processing of the sensor data.

A wireless network is often the means of choice in manufacturing automation, because hardwiring the sensors would be too time-consuming and cost-intensive. Wiring also entails restricted freedom of movement and is a regular source of errors, which fact is not least attributable to the harsh environments encountered in industrial settings and which can give rise to further costs as a result of production outages. Here, wireless access to sensors and also to actuators avoids the aforementioned problems and also has the advantage of ensuring increased flexibility in the case of process changes or modifications to process devices.

The use of the teachings of document [1] in conjunction with the specifications in the IEEE Standard 802.15.4 ensures a reliable method for wireless and energy-saving transmission of sensor data.

A protocol using a superframe is defined for the communication of the sensor node and the gateway. A superframe defines an allocation of respective time slots to the individual sensor nodes. Here, at least one dedicated time slot for communication between the respective sensor node and the gateway is provided for each respective sensor node.

A periodic transmission of beacons by the gateway at the start of each superframe is provided for synchronization of an internal working clock pulse of the sensor node with the clock pulse rate of the superframe transmitted by the gateway superframe.

In order to optimize the high requirements on the brevity of the latency, the exchange of as much configuration information as possible is to a large extent avoided. This economy of data exchange is also supported by the provision of a production mode, also known as an "online mode", which can be operated alternatively to non-productive modes, e.g., a configuration mode or a discovery mode. While an exchange of configuration information is provided in a configuration mode, in production mode, an exchange of this kind is kept as low as possible. Instead, when a production mode is running, the configuration information is extensively stored in the sensor node.

However, optimization in the above-described sense is achieved at the expense of the flexibility of the sensor network. For example, due to manufacturing requirements, it is not at present possible to notify newly added sensors in production mode to the gateway without leaving production mode and entering configuration mode, which involves the great disadvantage of the need to interrupt the manufacturing process during configuration mode.

SUMMARY OF THE INVENTION

It is an object of the invention to provide a method with which a change to the configuration, in particular the addition of further sensor nodes, is supported in a simpler way than that known hitherto in the prior art.

This and other objects and advantages are achieved in accordance with the invention by a beacon, a superframe, a sensor node, a star network and a method in which a beacon is provided for a star network comprising at least one gateway and at least one sensor node, where the beacon comprises a field containing information about a number of base time slots in a superframe.

A base time slot corresponds to a basic unit for the length of a time slot, where, if required, a plurality of base time slots can be connected to form a combined time slot. Hereinafter, the term 'time slot' is used as a synonym for a base time slot.

The invention is initially based on the premise that it is not necessary to leave production mode for changes in the configuration, in particular for the addition of further sensor node. Instead, a beacon will be disclosed with which the addition of a further sensor node is enabled by the addition of a time slot assigned to this additional sensor node without having to change to a configuration mode.

To this end, in accordance with the invention a beacon is provided comprising a field in which information about a number of base time slots is stored in a superframe. Hence, the invention supports the constant notification to the sensor node at the start of each superframe of how many time slots are contained in the superframe and hence how many of the sensor nodes assigned to the respective star network can participate in the communication.

If the value in the field in accordance with the invention containing the information about the number of base time slots in the following superframe is changed, this can indicate to a communicating sensor node that a new sensor node has joined the star network.

The superframe starting with this beacon, or—depending upon the definition of the start of the superframe—the superframe following this beacon then contains the displayed number of base time slots. With the aid of the information in accordance with the invention about the number of base time slots in the superframe, the network nodes are able to derive this information directly from the beacon without circuitous calculations and hence adjust correspondingly quickly to the changed configuration in the network structure.

In particular, the configuration change can occur in production mode which, from the manufacturing point of view, has the considerable advantage that the manufacturing process does not have to be stopped due to the change to a configuration mode that would otherwise be necessary. The method in accordance with the invention for the operation of the sensor node provides the following steps:

the reception of the beacon by the sensor nodes,
the comparison of the received value for the number of base time slots in a superframe with the corresponding value held in the sensor node,
if conformity of the received value with the value held is determined in the sensor node, the value held in the respective sensor node (SN1,SN2,N3) will continue to be used,
if no conformity of the received value with the value held is determined in the sensor node, the value held is overwritten with the received value for the number of base time slots in a superframe.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment with further advantages and embodiments of the invention is described in more detail below with reference to the drawing, in which.

DETAILED DESCRIPTION OF THE PREFERRED EMBODIMENTS

Figure 1:
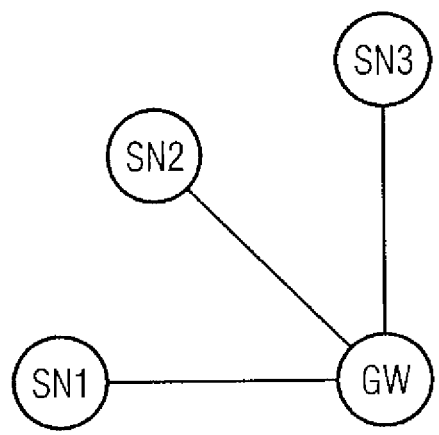
FIG. 1 is a schematic illustration of star network.

FIG. 1 shows a simplified depiction of a wireless communication network for manufacturing automation comprising a gateway GW and sensor nodes SN1, SN2, SN3, each connected to the gateway GW in a star shape. The respective sensor nodes SN1, SN2, SN3 are, for example, battery-operated and comprise an air interface. The air interface connection for the sensor nodes SN1, SN2, SN3 to the gateway GW is indicated by a continuous line in the drawing.

Figure 2:
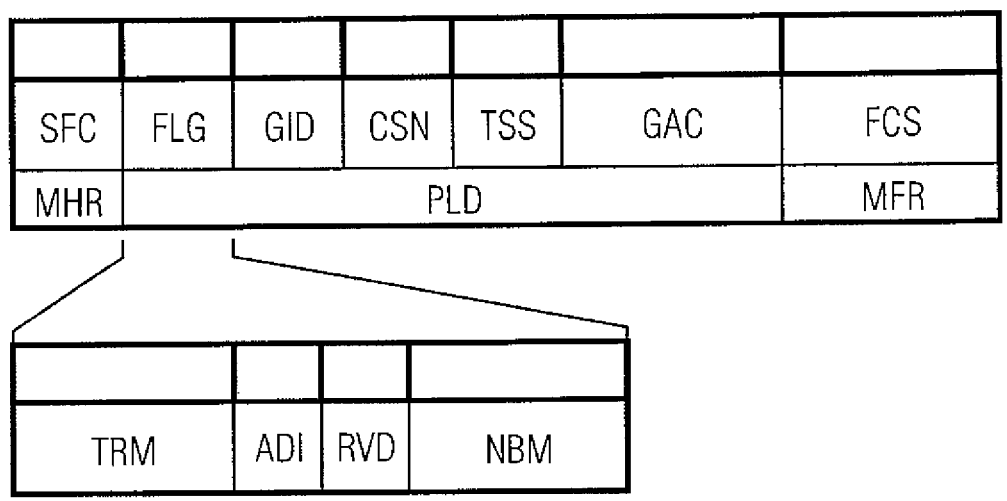
FIG. 2 is a schematic illustration of the structure of a conventional beacon.

The upper part of FIG. 2 shows a conventional beacon structure in accordance with publication [1]. The beacon comprises a message header MHR, a payload part PLD and a message footer MFR.

The message header MHR comprises as a single field a shortened frame control field SFC. This shortened frame control field comprises a MAC header shortened to one byte or one octet.

The payload part PLD of the beacon comprises, in the following sequence and entered in the drawing from left to right, the following fields:

A flag field FLG ("Flags")for receiving control information for the beacon, in particular the type of mode, for example, production mode (online mode), configuration mode or discovery mode (discovery mode). The flag field FLG has a length of one octet.

A gateway identification field GID ("Gateway ID") for identifying a gateway GW belonging to the respective sensor node SN1, SN2, SN3. The gateway identification field GID has a length of one octet.

A configuration sequence field CSN ("Configuration Sequence Number") for indicating 256 clearly distinguishable configurations. The configuration sequence field CSN has a length of one octet.

A time slot size field TSS ("Timeslot Size") for indicating the size of a base time slot in multiples of octets. The time slot size field TSS has a length of one octet.

A group acknowledgement field GAC ("Group Acknowledgement") for acknowledging a successful reception of data taken from the sensor nodes SN1, SN2, SN3. The group acknowledgement field GAC has a variable length and is only used in production mode, while in configuration mode, for example, it has a length of zero, i.e., it is not present in the beacon.

The message footer MFR of the beacon of FIG. 1 contains as a single field a frame control field FCS ("Frame Control Sequence"), the contents of which are used for the identification of bit transmission errors.

The lower part of FIG. 2 shows a detailed view of the flag field FLG. The flag field FLG has a length of one octet and comprises the following flags:

A transmission mode identifier TRM for identifying the transmission mode ("Transmission Mode"), where the transmission mode identifier TRM has a length of 3 bits.

A subsequent actuator communication direction identifier ADI ("Actuator Direction") for identifying the actuator communication direction. The actuator communication direction identifier ADI has a length of 1 bit.

A reserved identifier RVD with a length of 1 bit.

An identifier NBM for indicating a number of base time slots per management time slot ("Number of Base Time Slots per Management Time Slot"). The identifier NBM indicates the number of base time slots per management time slot, where the value range of the flag NBM extends from 0 (no management time slots present) to 7 (maximum length of the management time slots). To this end, the identifier NBM has a length of 3 bits.

Document [1] describes data communication in a production mode using the beacon structure shown in FIG. 2. The beacon supplies a specification via two management time slots following the beacon chronologically. The management time slots are defined by the length of a base time slot, as indicated in the time slot size field TSS, multiplied by a positive integer in the range between zero and seven. The last-named positive integer is indicated in the identifier NBM. Using the implicit knowledge that exactly one management time slot is used for a respective transmission direction (uplink/uplink/downlink) between the respective sensor node SN1, SN2, SN3 and the gateway GW, the management time slots can be used for data communication for newly added sensor nodes SN1, SN2, SN3, which have not yet been configured by the gateway GW.

With the exception of the length of a base time slot, as indicated in the time slot size field TSS, the beacon does not contain any further explicit information about the structure of the whole superframe in the beacon. All further information relating to the structure of the superframe, in particular the number of time slots in the superframe, is transmitted by the gateway GW during configuration mode to the connected sensor nodes SN1, SN2, SN3 and from this time on is linked to a configuration, which is identified by the configuration sequence number CSN.

Hence, a procedure of this kind is, on the one hand, computationally intensive, inflexible with respect to the addition of further sensor nodes and also, as explained in more detail below, only suboptimal with respect to an energy-efficient operation of the sensor nodes in the connection with a sleep mode.

Figure 3:
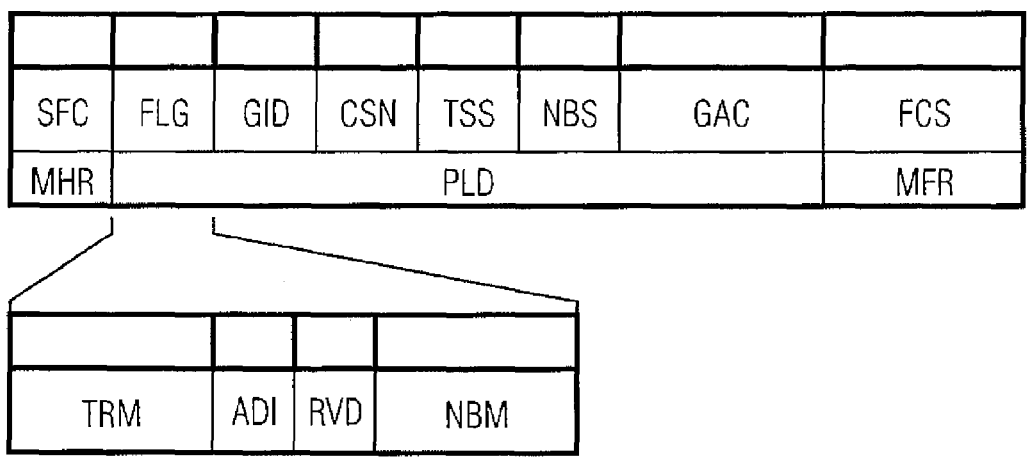
FIG. 3 is a schematic illustration of the structure of a beacon in a production mode in accordance with the invention.

FIG. 3 shows a beacon structure in accordance with the invention. The beacon structure in accordance with the invention differs from the conventional beacon structure of FIG. 1 in that a further field NBS ("Number of Base Time Slots in Superframe") is added to the payload part PLD. In a preferred embodiment of the invention, the field NBS for indicating the number of base time slots per superframe is arranged between the time slot size field TSS and the group acknowledgement field GAC and has a length of 1 octet. However, the arrangement and the length of the field NBS can also be embodied otherwise.

In accordance with an advantageous embodiment of the invention, the beacon structure has a substantially similar structure in different modes, i.e., in production mode, configuration mode and discovery mode. However, depending upon the respective mode, certain fields, e.g., the group acknowledgement field GAC provided for a variable length, can have a length of 0, i.e., not be present in the beacon structure.

In the field NBS for indicating the number of base time slots per superframe newly added to the beacon in accordance with the invention, the length of the superframe is specified as multiples of the length of a base time slot.

In accordance with the invention, three embodiments are provided for the point at which counting of the number of base time slots in the superframe starts:

In accordance with a first embodiment, the counting starts at the start of a superframe. This means that the field NBS in accordance with the present embodiment comprises the necessary base time slots for the beacon and the management time slots.

In accordance with a second embodiment, the counting is started after the beacon. This means that the value in the field NBS in accordance with the present embodiment contains the number of base time slots that are retained for the management time slots. On the other hand, the counting in accordance with this second embodiment does not contain the base time slots necessary for the beacon.

In accordance with a preferred third embodiment, the counting starts after the management time slots. This means that the value for the number of base time slots in a superframe in the field NBS in accordance with the present embodiment only takes into account the number of base time slots available for communication of the sensors in production mode.

The third embodiment according to the above depiction is preferred, since it permits the longest superframe. In other words, this counting method also permits the largest possible number of sensor nodes in the star network.

As mentioned above, according to one advantageous embodiment of the invention, the beacon structure has a substantially similar structure in different modes. This refers in particular to the following fields:

field NBM in the flag field FLG for indicating the number of base time slots for a management time slot,
gateway identification field GID,
configuration sequence field CSN, and
time slot size field TSS.

The values of these four fields are important in order, within the scope of the identification and/or configuration mode, to transmit explicit information about the length of a management time slot to a newly added node.

The following fields
field NBS for indicating the number of base time slots per superframe and
group acknowledgement field GAC can on the other hand, in accordance with an alternative embodiment of the invention, be omitted in discovery and/or configuration mode. If the aforenamed fields are contained in the beacon, they permit additional functionalities on the part of the sensor nodes SN1, SN2, SN3.

The actuator communication direction identifier ADI is usually only used during production mode and can be ignored in discovery and configuration modes.

The gateway can use the method in accordance with the disclosed embodiments to change certain configurations in production mode. This means that the disadvantageous change to configuration mode that was hitherto necessary is dispensed with. Instead, the star network can use the inventive means to stay in production mode without interruption. An example of a change to the configuration is the addition of further time slots at the end of a superframe, see also FIG. 6. Here, the disclosed embodiments of the invention enable any changes to be made to the length of the superframe as long as no existing assignments between the sensor nodes SN1, SN2, SN3 and the respective time slots belonging thereto are affected.

A further substantial advantage of the disclosed embodiments of the invention consists in the improved support for an energy-efficient mode of operation of the sensor nodes SN1, SN2, SN3. An energy-efficient mode of operation of the sensor nodes SN1, SN2, SN3 of this kind is achieved by an already known switching-off of the air interface (sleep mode) for a lengthy period.

Sleep mode is usually interrupted for a planned reception of a beacon. Reception of beacons is namely used for a necessary synchronization of the sensor nodes SN1, SN2, SN3 and to obtain data on the current network status. With the field NBS in accordance with the disclosed embodiments of the invention for indicating the number of base time slots per superframe, a sensor node SN1, SN2, SN3 obtains more information about the time at which a next beacon arrives even if the length of a superframe actually changes. Therefore, the measure in accordance with the disclosed embodiments of the invention permits improved usage of the energy-saving sleep mode.

One advantage also achieved by the identity of the beacon structure in discovery and configuration modes consists in the fact that a sensor mode receiving this beacon is able to communicate with the gateway GW according to a protocol even if this sensor node has not yet been configured or accepted into the network.

In the following FIGS. 4 and 5, the numbers in brackets are not reference numbers but an inherent value in the respective field.

Figure 4:
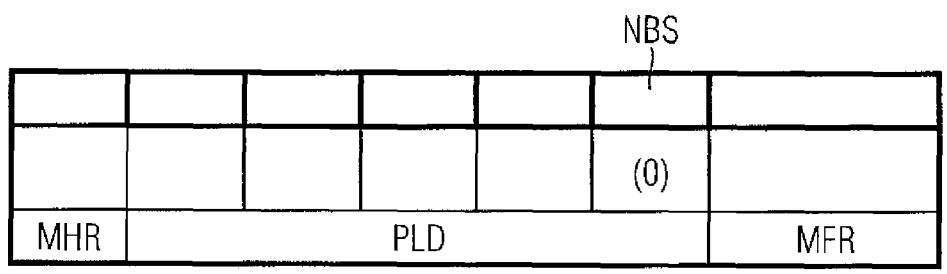
FIG. 4 is a schematic illustration of the structure of a beacon in a configuration mode with a depiction of exemplary values in accordance with the invention.

FIG. 4 shows a beacon structure in accordance with the invention during a configuration mode. In FIG. 4, the field NBS for indicating the number of base time slots in a superframe has a value of 0, as shown in the drawing by a 0 placed in brackets. In configuration mode, the group acknowledgment field GAC has a length of 0 and is therefore not shown in the drawing.

Figure 5:
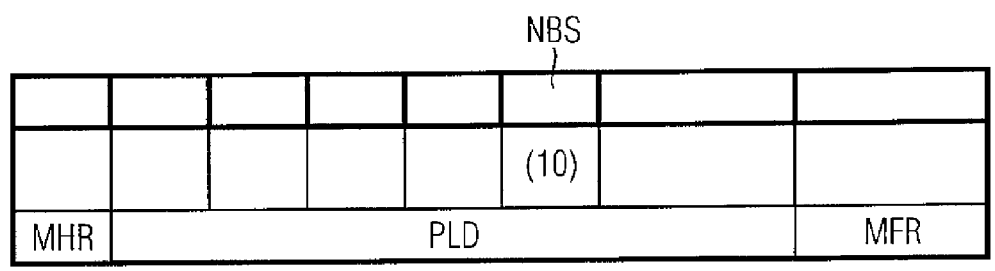
FIG. 5 is a schematic illustration of the structure of a beacon in a production mode with a depiction of exemplary values in accordance with the invention.

FIG. 5 is a beacon structure in accordance with the invention in production mode. In production mode, the group acknowledgement field GAC has a variable length. However, the contents of the group acknowledgment field GAC are of no relevance for further explanation. In the beacon structure shown in FIG. 3, the field NBS for indicating the number of base time slots in a superframe is arranged to the left of the group acknowledgement field and has a value of 10, as indicated in the drawing by a number 10 placed in brackets.

In deviation from the number of sensor nodes SN1, SN2, SN3 in FIG. 1, in the following, a star network with eight sensor nodes is assumed. An associated superframe comprises a beacon and two management time slots. The management time slots have a length of six base time slots. The superframe also comprises ten base time slots for communication with the sensor nodes.

In accordance with the third embodiment for counting of the number of base time slots in a superframe (see above), this counting starts after the management time slots. As production mode is present, the transmission mode identifier TRM has a binary value of 000.

In discovery mode, this binary would have a value of 100 and, in configuration mode, this value would be 110.

Figure 6:
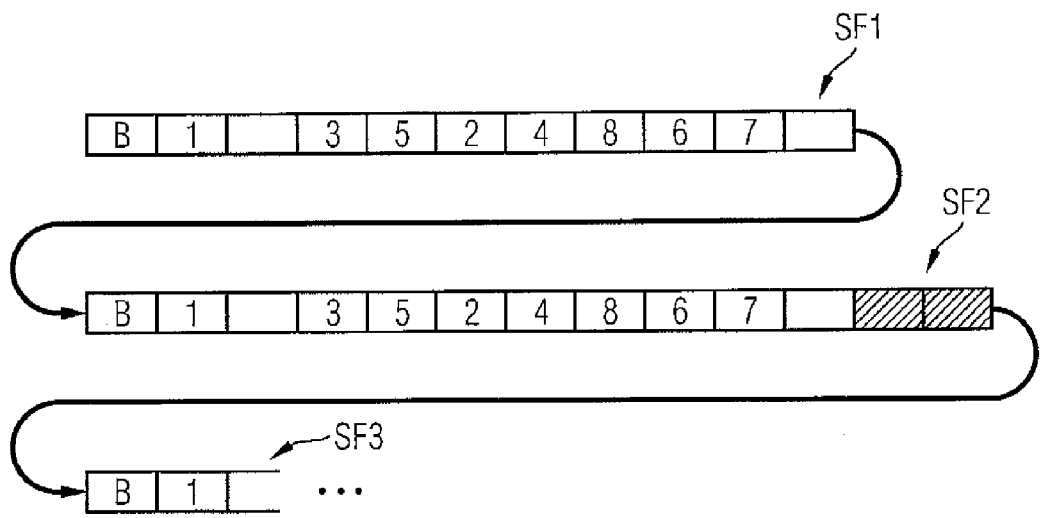
FIG. 6 a time flowchart for the depiction of a plurality of superframes using a beacon in accordance with the invention.

FIG. 6 shows a time flowchart of a transmission of superframes SF1, SF2, SF3. At the topmost point of FIG. 6, the drawing shows a first superframe SF1 followed chronologically by a second superframe SF2. The second superframe SF2 is followed by a third superframe SF3, which is only partially shown in the drawing. The time flowchart also includes an advance of the time from the top to the bottom and from the left to the right.

The first superframe SF1 comprises a beacon B followed by a number of 10 rectangular base time slots. Some of the rectangular base time slots have an identifier designating corresponding sensor nodes SN1, SN2, SN3. For example, the beacon B has an adjacent first time slot 1, which is used to transmit data from and to the sensor node SN1.

In the beacon in accordance with the disclosed embodiments of the invention B, according to the number of base time slots, namely 10, a value of 10 is entered in the field NBS. In the second superframe SF2, the number of base time slots now changes to a value 12 by an addition of two in the base time slots shown hatched in the drawing. Correspondingly, a value of 12 is entered in the field NBS of the beacon B for the second superframe SF2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gateway for a star network including at least one gateway and at least one sensor node, the gateway comprising:
 a processor; and
 memory, said gateway transmitting a beacon for the star network and said beacon including:
  a flag field for receiving control information for the beacon for identifying one of (i) a production/online mode, (ii) a configuration mode and (iii) a discovery mode; and
  a field containing, within the production/online mode, information indicating a number of base time slots in a superframe.

2. The system gateway as claimed in claim 1, wherein the beacon comprises further fields including at least one of a gateway identification field for identifying a gateway belonging to a respective sensor node, and a time slot size field for indicating a size of a base time slot.

3. The gateway as claim in claim 1, wherein the beacon further comprises a group acknowledgement field for acknowledging successful reception of data.

4. The gateway as claimed in claim 1, wherein counting the number of base time slots in the superframe starts after the management time slots of the superframe.

5. A gateway for a star network including at least one sensor node, the gateway comprising:
 a processor; and
 memory, said gateway transmitting a superframe for the star network and said superframe including:
 a beacon for the star network comprising a flag field for receiving control information for the beacon for identifying one of (i) a production/online mode, (ii) a configuration mode and (iii) a discovery mode, and a field containing, within the production/online mode, information indicating a number of base time slots in the superframe.

6. The superframe as claimed in claim 5, wherein one management time slot is available for each transmission direction and management time slots are arranged directly after the beacon.

7. A plurality of sensor nodes in a star network, each of the plurality of sensor nodes having a processor, and memory, and receiving a beacon for the star network and said beacon including: a flag field for receiving control information for the beacon for identifying one of (i) a production/online mode, (ii) a configuration mode and (iii) a discovery mode; and a field containing, within the production/online mode, information indicating a number of base time slots in a superframe.

8. A star network with at least one gateway and at least one sensor node as claimed in claim 7.

9. A method for operating a star network as comprising a gateway and a plurality of sensor nodes, the method comprising:
 receiving, by a sensor node, a beacon of a star network, said beacon comprising a flag field for receiving control information for the beacon for identifying one of (i) a production/online mode, (ii) a configuration mode and (iii) a discovery mode, and comprising a field including, within the production/online mode, information about a number of base time slots in a superframe; and overwriting a value held in the sensor node representing the number of base time slots in the superframe with a received value for the number of base time slots in the superframe.

10. A sensor node for a star network including at least one gateway and at least one sensor node, the sensor node comprising:
   a processor; and
   memory, said sensor node receiving a beacon for the star network and said beacon including:
      a flag field for receiving control information for the beacon for identifying one of (i) a production/online mode, (ii) a configuration mode and (iii) a discovery mode; and
      a field containing, within the production/online mode, information indicating a number of base time slots in a superframe.

11. The sensor node as claimed in claim 10, wherein the beacon further comprises fields including at least one of a gateway identification field for identifying a gateway belonging to a respective sensor node, a configuration sequence field for identifying different configurations, and a time slot size field for indicating a size of a base time slot.

12. The sensor node as claim in claim 10, wherein the beacon further comprises a group acknowledgement field for acknowledging successful reception of data.

13. The sensor node as claimed in claim 10, wherein counting the number of base time slots in the superframe starts after the management time slots of the superframe.

* * * * *